(12) United States Patent
Tsugai et al.

(10) Patent No.: US 6,494,094 B1
(45) Date of Patent: Dec. 17, 2002

(54) ANGULAR RATE SENSOR

(75) Inventors: Masahiro Tsugai; Nobuaki Konno; Hiroyuki Fujita, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/562,288

(22) Filed: May 1, 2000

(30) Foreign Application Priority Data

Nov. 1, 1999 (JP) .......................................... 11-311367

(51) Int. Cl.$^7$ ................................................. G01P 9/04
(52) U.S. Cl. .................................................. 73/504.12
(58) Field of Search ........................ 73/504.02, 504.03, 73/504.04, 504.08, 504.09, 504.12, 514.32; 310/329

(56) References Cited

U.S. PATENT DOCUMENTS

| | | | | |
|---|---|---|---|---|
| 4,699,006 A | * | 10/1987 | Boxenhorn | ............... 73/504.12 |
| 5,408,877 A | | 4/1995 | Greiff et al. | ................... 73/505 |
| 5,488,862 A | * | 2/1996 | Neukermans et al. | .... 73/504.02 |
| 5,629,790 A | * | 5/1997 | Neukermans et al. | ........ 359/198 |
| 6,009,751 A | * | 1/2000 | Ljung | ...................... 73/504.12 |
| 6,044,705 A | * | 4/2000 | Neukermans et al. | .... 73/504.02 |

OTHER PUBLICATIONS

Kuisma et al.; "A Bulk Micromachined Silicon Angular Rate Sensor", 1997.

Greiff et al.; "Silicon Monolithic Micromechanical Gyroscope", *The Charles Stark Draper Lab.*, Cambridge, Mass., pp. 966–968, 1991.

* cited by examiner

*Primary Examiner*—Helen Kwok
(74) *Attorney, Agent, or Firm*—Leydig, Voit & Mayer, Ltd.

(57) ABSTRACT

A conventional angular rate sensor has a problem that the displacement amplitude of a drive gimbal frame is limited due to the Pulled-in phenomenon where the drive gimbal frame is attached to drive electrodes, thereby decreasing its sensor sensitivity. In an angular rate sensor, a drive frame and a driven frame are separately provided. A bending oscillation of the drive frame is transmitted to the driven frame through link beams, causing the rotational oscillation of the driven frame. The displacement amplitude of a rotational oscillation of the driven frame is not limited to provide high sensor sensitivity.

19 Claims, 11 Drawing Sheets

ANGULAR RATE SENSOR

BACKGROUND OF THE INVENTION

1. Field of the Invention

The present invention relates to an angular rate sensor used for controlling the motion of a vehicle and an aircraft.

2. Description of Related Art

FIG. 19 is a top view showing a conventional angular rate sensor disclosed in U.S. Pat. No. 5,408,877. FIG. 20 is a sectional view along the line XX—XX of FIG. 19. In these figures, the reference numeral 101 designates an inertial mass; 102 designates a drive gimbal frame on which the inertial mass is mounted; 103 designates a detection gimbal frame surrounding the drive gimbal frame 102; 104 designates a first torsion beam connecting the drive gimbal frame 102 with the detection gimbal frame 103 to rotatably support the drive gimbal frame 102 at two opposed positions; 105 designates a second torsion beam rotatably supporting the detection gimbal frame 103 at two opposed positions; 106 designates a drive electrode disposed below the drive gimbal frame 102 apart from the frame 102 by a certain gap; 107 designates a detection electrode disposed above the detection gimbal frame 103; and 108 designates a silicon substrate supporting the second torsion beam 105 and the drive electrodes 106.

The torsion axes of the first torsion beams 104 are parallel to the Y axis, while the torsion axes of the second torsion beams 105 are parallel to the X axis. The torsion axes of the first torsion beams 104 are perpendicular to the torsion axes of the second torsion beams 105.

The drive electrodes 106 are parallel to the torsion axes of the first torsion beams 104. These two electrodes 106 are symmetrically placed about the line extended from the torsion axes of the first torsion beams 104 viewed from the direction of the Z axis.

The detection electrodes 107 parallel to the torsion axes of the second torsion beam 105 are symmetrically placed about the line extended from the torsion axes of the second torsion beams 105 viewed from the direction of the Z axis.

Next, the operation of the conventional angular rate sensor will be described.

On applying alternating voltages with mutual phase-difference of 180 degrees to the two drive electrodes 106, an electrostatic attractive force induced between the drive gimbal frame 102 and one of the drive electrodes 106 leads to torsion of the first torsion beams 104, causing a rotational oscillation of the drive gimbal frame 102 (reference oscillation) about the torsion axes of the first torsion beams 104 which function as a rotational axis. As a result, the mass center of the inertial mass 101 oscillates in a simple harmonic motion in the direction parallel to the X axis.

In this state, the rotation of the entire angular rate sensor about the Z axis generates the Coriolis force represented by the following equation (1) acting on the center of the inertial mass 101 in the direction parallel to the Y axis. The second torsion beams 105 are then distorted and the detection gimbal frame 103 rotationally oscillates about the torsion axes of the second torsion beams 105 as a rotational axis.

$$F = 2VM\Omega \quad (1)$$

wherein V represents a rate of the inertial mass 101 in the direction parallel to the X axis, M represents an inertial mass and $\Omega$ represents a rotational angular rate about the Z axis.

The displacement amplitude of the rotational oscillation of the detection gimbal frame 103 is proportional to the maximum absolute value of the Coriolis force F which is proportional to the angular rate $\Omega$. Further, as the detection gimbal frame 103 rotationally oscillates, the electrostatic capacity between the detection gimbal frame 103 and the detection electrode 107 changes. This change in electrostatic capacity is converted into a voltage to obtain a sensor output proportional to the angular rate $\Omega$.

As stated above, in the conventional angular rate sensor the electrostatic attractive force generated between the drive gimbal frame 102 and the drive electrodes 106 is used for inducing reference oscillation. The electrostatic attractive force is inversely proportional to the square of the distance between the drive gimbal frame 102 and the drive electrodes 106. Thus, once the first torsion beams 104 are greatly distorted, the rotational angle of the drive gimbal frame 102 increases and the distance between the drive gimbal frame 102 and one of the drive electrodes 106 decreases. As a result, an electrostatic attractive force exceeds the restoring force of the first torsion beams 104, causing the Pulled-in phenomenon where the drive gimbal frame 102 is attached to one of the drive electrodes 106. Consequently, the displacement amplitude of the rotational oscillation of the drive gimbal frame 102 is limited such that the distance between the drive gimbal frame 102 and the drive electrodes 106 is not more than one third of the gap therebetween for a stable rotational oscillation of the drive gimbal frame 102.

Since the conventional angular rate sensor is constructed as above, the displacement amplitude of the rotational oscillation of the drive gimbal frame 102 is limited for avoiding the Pulled-in phenomenon. As a result, a rate V of the mass center of the inertial mass 101 in the direction parallel to the X axis is limited and the Coriolis force F is thus limited. In other words, there exists a problem that the displacement amplitude of the rotational oscillation of the drive gimbal frame 102 is limited, and hence the sensitivity of the angular rate sensor is limited.

Alternatively, in a case that an angular rate sensor of high sensitivity is designed under the condition that the distance between the drive gimbal frame 102 and the drive electrodes 106 is not more than one third of the gap therebetween, a large gap is required for a large displacement amplitude of the rotational oscillation of the drive gimbal frame 102. However, in this case, since a large electrostatic attractive force is required, larger driving voltages should be applied to the drive electrodes 106 and the facing areas between the drive gimbal frame 102 and the drive electrodes 106 should be larger. This design is impractical.

In addition, there is another problem that the conventional angular rate sensor can detect only a rotational angular rate about one axis.

SUMMARY OF THE INVENTION

The present invention is implemented to solve the above problems. An object of the present invention is to provide an angular rate sensor of high sensitivity with a drive frame and a frame to be driven (hereinafter referred to as driven frame) separately provided, in which the driven frame is not directly but indirectly driven through the drive frame.

Another object of the present invention is to provide an angular rate sensor capable of detecting rotational angular rates about a plurality of axes.

According to a first aspect of the present invention, there is provided an angular rate sensor comprising: an inertial mass; a driven frame surrounding the inertial mass; inertial mass torsion beams connecting the inertial mass with the driven frame to rotatably support the inertial mass at two opposed positions; driven frame torsion beams rotatably supporting the driven frame at two opposed positions; a drive frame surrounding a half circumference of the driven frame referenced to a line extended from torsion axes of the driven frame torsion beams; driving force generation means for giving a driving force to cause a bending oscillation of the drive frame in an out-of-plane direction; link beams connecting the driven frame with the drive frame; and detection means for detecting a displacement amplitude of a rotational oscillation of the inertial mass.

According to a second aspect of the present invention, there is provided an angular rate sensor comprising: an inertial mass; a driven frame surrounding the inertial mass; inertial mass torsion beams connecting the inertial mass with the driven frame to rotatably support the inertial mass at two opposed positions; driven frame torsion beams rotatably supporting the driven frame at two opposed positions; a drive frame surrounding a half circumference of the driven frame referenced to a line extended from torsion axes of the driven frame torsion beams to support the driven frame torsion beams; driving force generation means for giving a driving force to cause a bending oscillation of the drive frame in an out-of-plane direction; and detection means for detecting a displacement amplitude of a rotational oscillation of the inertial mass; wherein a center of gravity of the driven frame is shifted from a line extended from torsion axes of the driven frame torsion beams, viewed from the direction perpendicular to top and bottom surfaces of the driven frame.

Here, the angular rate sensor may further comprise monitor means for monitoring a displacement amplitude of a rotational oscillation of the driven frame.

A mass center of the inertial mass may be positioned on a line extended from torsion axes of the driven frame torsion beams or shifted from the line, viewed from the direction perpendicular to top and bottom surfaces of the driven frame. The driven frame rotationally oscillates about the torsion axes of the driven frame torsion beams or another axis as a rotational axis. It often rotationally oscillates about an axis between the torsion axes of the driven frame torsion beams and longitudinal axes of the link beams.

A mass center of the inertial mass may be positioned on a line extended from torsion axes of the driven frame torsion beams, viewed from the direction perpendicular to top and bottom surfaces of the driven frame; and positioned above the top surface of the driven frame or below the bottom surface thereof, viewed from the direction parallel to the top and bottom surfaces thereof: and torsion axes of the inertial mass torsion beams may be perpendicular to the torsion axes of the driven frame torsion beams.

A mass center of the inertial mass may be shifted from a line extended from torsion axes of the driven frame torsion beams, viewed from the direction perpendicular to top and bottom surfaces of the driven frame; and positioned above the top surface of the driven frame or below the bottom surface thereof, viewed from the direction parallel to the top and bottom surfaces thereof: and torsion axes of the inertial mass torsion beams may be perpendicular to the torsion axes of the driven frame torsion beams.

A mass center of the inertial mass may be shifted from a line extended from torsion axes of the driven frame torsion beams, viewed from the direction perpendicular to top and bottom surfaces of the driven frame; and positioned above the top surface of the driven frame or below the bottom surface thereof, viewed from the direction parallel to the top and bottom surfaces thereof: and torsion axes of the inertial mass torsion beams may be parallel to the torsion axes of the driven frame torsion beams.

The link beams may be connected to the driven frame near the driven frame torsion beams.

The inertial mass and the inertial mass torsion beams may be at least two of; a first inertial mass whose mass center is positioned on a line extended from torsion axes of the driven frame torsion beams, viewed from the direction perpendicular to top and bottom surfaces of the driven frame, and positioned above the top surface of the driven frame or below the bottom surface thereof, viewed from the direction parallel to the top and bottom surfaces of the driven frame; and first inertial mass torsion beams connecting the first inertial mass with the driven frame, torsion axes of the first inertial mass torsion beams being perpendicular to the torsion axes of the driven frame torsion beams; a second inertial mass whose mass center is shifted from a line extended from torsion axes of the driven frame torsion beams, viewed from the direction perpendicular to top and bottom surfaces of the driven frame, and positioned above the top surface of the driven frame or below the bottom surface thereof, viewed from the direction parallel to the top and bottom surfaces of the driven frame; and second inertial mass torsion beams connecting the second inertial mass with the driven frame, torsion axes of the second inertial mass torsion beams being perpendicular to the torsion axes of the driven frame torsion beams; and a third inertial mass whose mass center is shifted from a line extended from torsion axes of the driven frame torsion beams, viewed from the direction perpendicular to top and bottom surfaces of the driven frame, and positioned above the top surface of the driven frame or below the bottom surface thereof, viewed from the direction parallel to the top and bottom surfaces of the driven frame; and third inertial mass torsion beams connecting the third inertial mass with the driven frame, torsion axes of the third inertial mass torsion beams being parallel to the torsion axes of the driven frame torsion beams: and the angular rate sensor may comprise at least two rotational angular rate detection parts of; a first rotational angular rate detection part having the first inertial mass and the first inertial mass torsion beams; a second rotational angular rate detection part having the second inertial mass and the second inertial mass torsion beams; and a third rotational angular rate detection part having the third inertial mass and the third inertial mass torsion beams.

The inertial mass may be first and second inertial masses whose mass centers are symmetrically placed about a line extended from torsion axes of the driven frame torsion beams, viewed from the direction perpendicular to top and bottom surfaces of the driven frame, and positioned above the top surface of the driven frame or below the bottom surface thereof, viewed from the direction parallel to the top and bottom surfaces of the driven frame; and the inertial mass torsion beams may be first inertial mass torsion beams connecting the first inertial mass with the driven frame and second inertial mass torsion beams connecting the second inertial mass with the driven frame, torsion axes of the first and second inertial mass torsion beams being parallel to each other.

The drive frame may be a first drive frame surrounding a half circumference of the driven frame referenced to a line extended from torsion axes of the driven frame torsion beams and a second drive frame surrounding the other half circumference of the driven frame.

The driving force generation means may comprise a piezoelectric element provided on the drive frame, an electrode provided below the drive frame or a piezoresistor formed in the drive frame.

The detection means may comprise piezoresistors formed in the inertial mass torsion beams or an electrode provided below the driven frame.

The monitor means may comprise a piezoelectric element provided on the drive frame, an electrode below the drive frame or piezoresistors formed in the driven frame torsion beams.

As stated above, according to an aspect of the present invention, an angular rate sensor is constructed to comprise: an inertial mass; a driven frame surrounding the inertial mass; inertial mass torsion beams connecting the inertial mass with the driven frame to rotatably support the inertial mass at two opposed positions; driven frame torsion beams rotatably supporting the driven frame at two opposed positions; a drive frame surrounding a half circumference of the driven frame referenced to a line extended from torsion axes of the driven frame torsion beams; driving force generation means for giving a driving force to cause a bending oscillation of the drive frame in an out-of-plane direction; link beams connecting the driven frame with the drive frame; and detection means for detecting a displacement amplitude of a rotational oscillation of the inertial mass. Consequently, there can be advantageously provided the angular rate sensor whose sensitivity is high, since the displacement amplitude of the rotational oscillation of the driven frame is not limited.

According to an aspect of the present invention, an angular rate sensor is constructed to comprise: an inertial mass; a driven frame surrounding the inertial mass; inertial mass torsion beams connecting the inertial mass with the driven frame to rotatably support the inertial mass at two opposed positions; driven frame torsion beams rotatably supporting the driven frame at two opposed positions; a drive frame surrounding a half circumference of the driven frame referenced to a line extended from torsion axes of the driven frame torsion beams to support the driven frame torsion beams; driving force generation means for giving a driving force to cause a bending oscillation of the drive frame in an out-of-plane direction; and detection means for detecting a displacement amplitude of a rotational oscillation of the inertial mass; wherein a center of gravity of the driven frame is shifted from a line extended from torsion axes of the driven frame torsion beams, viewed from the direction perpendicular to top and bottom surfaces of the driven frame. Consequently, there can be advantageously provided the angular rate sensor where the driven frame can rotationally oscillates in simple construction, since when the bending oscillation of the drive frame is transmitted to the entire driven frame through the driven frame torsion beams, a drive inertial force acts on the driven frame to cause the rotational oscillation of the driven frame about the torsion axes of the driven frame torsion beams as a rotational axis.

According to an aspect of the present invention, an angular rate sensor is constructed to further comprise monitor means for monitoring a displacement amplitude of a rotational oscillation of the driven frame. Consequently, there can be advantageously provided the angular rate sensor where the displacement amplitude of the rotational oscillation of the driven frame can be maintained constant by maintaining the output voltage from the monitor piezoelectric element constant.

According to an aspect of the present invention, an angular rate sensor is constructed such that the link beams are connected to the driven frame near the driven frame torsion beams. Consequently, there can be advantageously provided the angular rate sensor which can be driven at a low voltage, since even if the displacement amplitude of the bending oscillation of the drive frame is small, the displacement amplitude of the rotational oscillation of the driven frame is large.

According to an aspect of the present invention, an angular rate sensor is constructed such that the inertial mass and the inertial mass torsion beams are at least two of; a first inertial mass whose mass center is positioned on a line extended from torsion axes of the driven frame torsion beams, viewed from the direction perpendicular to top and bottom surfaces of the driven frame, and positioned above the top surface of the driven frame or below the bottom surface thereof, viewed from the direction parallel to the top and bottom surfaces of the driven frame; and first inertial mass torsion beams connecting the first inertial mass with the driven frame, torsion axes of the first inertial mass torsion beams being perpendicular to the torsion axes of the driven frame torsion beams; a second inertial mass whose mass center is shifted from a line extended from torsion axes of the driven frame torsion beams, viewed from the direction perpendicular to top and bottom surfaces of the driven frame, and positioned above the top surface of the driven frame or below the bottom surface thereof, viewed from the direction parallel to the top and bottom surfaces of the driven frame; and second inertial mass torsion beams connecting the second inertial mass with the driven frame, torsion axes of the second inertial mass torsion beams being perpendicular to the torsion axes of the driven frame torsion beams; and a third inertial mass whose mass center is shifted from a line extended from torsion axes of the driven frame torsion beams, viewed from the direction perpendicular to top and bottom surfaces of the driven frame, and positioned above the top surface of the driven frame or below the bottom surface thereof, viewed from the direction parallel to the top and bottom surfaces of the driven frame; and third inertial mass torsion beams connecting the third inertial mass with the driven frame, torsion axes of the third inertial mass torsion beams being parallel to the torsion axes of the driven frame torsion beams: and the angular rate sensor comprises at least two rotational angular rate detection parts of; a first rotational angular rate detection part having the first inertial mass and the first inertial mass torsion beams; a second rotational angular rate detection part having the second inertial mass and the second inertial mass torsion beams; and a third rotational angular rate detection part having the third inertial mass and the third inertial mass torsion beams. Consequently, there can be advantageously provided the angular rate sensor capable of detecting rotational angular rate about two or more axes.

According to an aspect of the present invention, an angular rate sensor is constructed such that the inertial mass is first and second inertial masses whose mass centers are symmetrically placed about a line extended from torsion axes of the driven frame torsion beams, viewed from the direction perpendicular to top and bottom surfaces of the driven frame, and positioned above the top surface of the driven frame or below the bottom surface thereof, viewed from the direction parallel to the top and bottom surfaces of the driven frame; and the inertial mass torsion beams are first inertial mass torsion beams connecting the first inertial mass with the driven frame and second inertial mass torsion beams connecting the second inertial mass with the driven frame, torsion axes of the first and second inertial mass torsion beams being parallel to each other. Consequently, there can be advantageously provided the angular rate sensor which can detect an angular rate with high sensitivity, since in a state that the driven frame rotationally oscillates, when the entire angular rate sensor rotates about an axis parallel to the torsion axes of the first and second inertial mass torsion beams, the first and second inertial masses rotationally oscillate in phases different from each other by 180 degrees.

According to an aspect of the present invention, an angular rate sensor is constructed such that the drive frame is a first drive frame surrounding a half circumference of the driven frame referenced to a line extended from torsion axes of the driven frame torsion beams and a second drive frame surrounding the other half circumference of the driven frame. Consequently, there can be advantageously provided the angular rate sensor which can detect an angular rate with high accuracy, since the driven frame stably rotationally oscillates.

According to an aspect of the present invention, an angular rate sensor is constructed such that the driving force generation means comprises a piezoelectric element provided on the drive frame. Consequently, there can be advantageously provided the angular rate sensor which can be driven at a low voltage, since a driving force can be supplied to the drive frame at a low voltage to cause a bending oscillation of the drive frame.

DETAILED DESCRIPTION OF THE PREFERRED EMBODIMENTS

Embodiments of the invention will be described with reference to the accompanying drawings.

Embodiment 1

Figure 1:
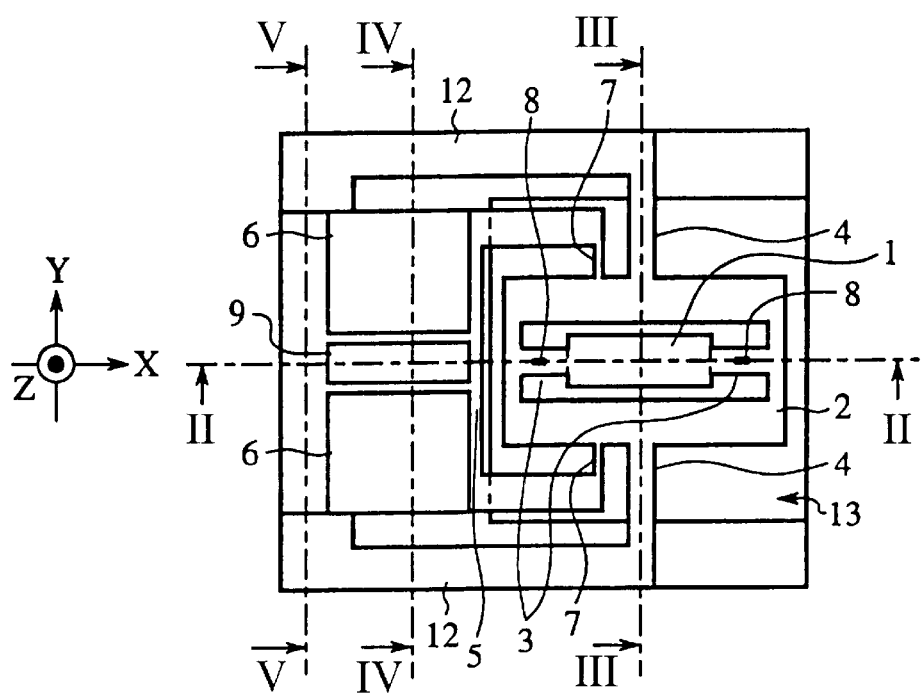
FIG. 1 is a top view showing an angular rate sensor of embodiment 1 according to the present invention.
Figure 2:
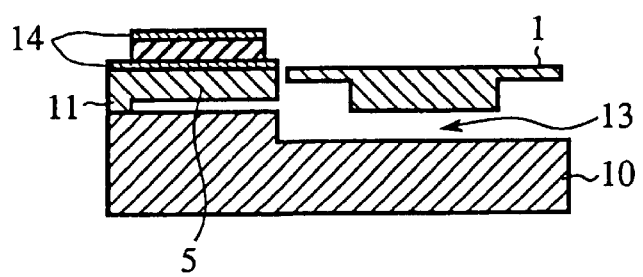
FIG. 2 is a sectional view along the line II—II of FIG. 1.
Figure 3:
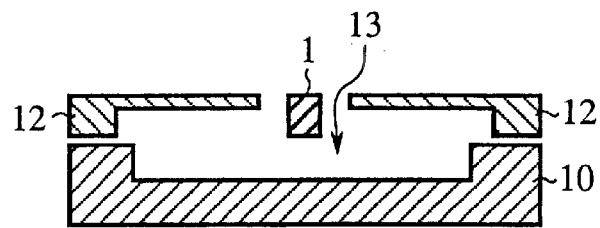
FIG. 3 is a sectional view along the line II—II of FIG. 1.
Figure 4:
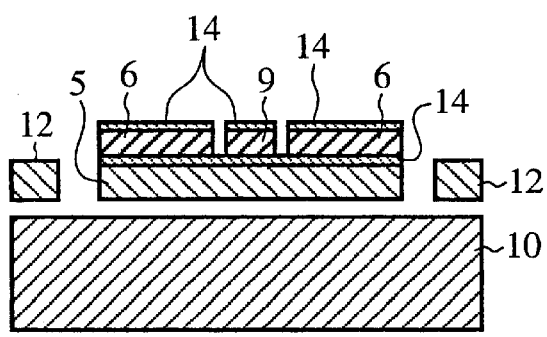
FIG. 4 is a sectional view along the line IV—IV of FIG. 1.
Figure 5:
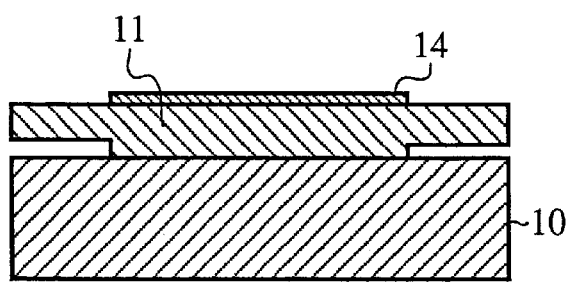
FIG. 5 is a sectional view along the line V—V of FIG. 1.

FIG. 1 is a top view showing an angular rate sensor of the embodiment 1 according to the present invention. FIG. 2 is a sectional view along the line II—II of FIG. 1. FIG. 3 is a sectional view along the line III—III of FIG. 1. FIG. 4 is a sectional view along the line IV—IV of FIG. 1. FIG. 5 is a sectional view along the line V—V of FIG. 1. In these figures, the reference numeral 1 designates an inertial mass; 2 designates a driven frame surrounding the inertial mass 1; 3 designates an inertial mass torsion beam connecting the inertial mass 1 with the driven frame 2 to rotatably support the inertial mass 1 at two opposed positions; 4 designates a driven frame torsion beam rotatably supporting the driven frame 2 at two opposed positions; 5 designates a drive frame surrounding a half circumference of the driven frame 2 referenced to the line extended from the torsion axes of the driven frame torsion beams 4; 6 designates a drive piezoelectric element (driving force generation means) for giving a driving force causing a bending oscillation of the drive frame 5 in an out-of-plane direction (Z axis direction); 7 designates a link beam connecting the driven frame 2 with the drive frame 5 and transmitting the bending oscillation of the drive frame 5 to the driven frame 2; 8 designates a detection piezoresistor (detection means) for detecting the displacement amplitude of a rotational oscillation of the inertial mass 1; and 9 designates a monitor piezoelectric element (monitor means) for monitoring the displacement amplitude of a rotational oscillation of the driven frame 2.

Further, the reference numeral 10 designates a support substrate; 11 designates an anchor part fixed on the support substrate 10 and connected to an end part of the drive frame 5; 12 designates a connection part connecting the driven frame torsion beam 4 with the anchor part 11; and 13 designates a concave part of the support substrate 10 formed below the inertial mass 1 and the driven frame 2 to prevent the inertial mass 1 and the driven frame 2 from contacting the support substrate 10 when it rotationally oscillates.

The inertial mass 1, the driven frame 2, the inertial mass torsion beams 3, the driven frame torsion beams 4, the drive frame 5, the link beams 7, the anchor part 11 and the connection parts 12 are formed by processing a silicon substrate. The support substrate 10 is made of, for example, silicon or a pyrex glass with a coefficient of linear expansion similar to that of silicon.

The mass center of the inertial mass 1 is positioned on the line extended from the torsion axes of the driven frame torsion beams 4, viewed from the direction perpendicular to the top and bottom surfaces of the driven frame 2, while it is positioned below the bottom surface of the driven frame 2, viewed from the direction parallel to the top and bottom surfaces of the driven frame 2. That is, in the state as shown in FIG. 1, the mass center of the inertial mass 1 is positioned on the line extended from the torsion axes of the driven frame torsion beams 4, viewed from the direction parallel to the Z axis, while it is positioned below the bottom surface of the driven frame 2, viewed from the direction parallel to the X axis or the Y axis. The term "line extended from the torsion axes of the torsion beams" used herein means the line connecting the two torsion axes of two opposing torsion beams.

The torsion axes of the inertial mass torsion beams 3 are parallel to the X axis, while the torsion axes of the driven frame torsion beams 4 are parallel to the Y axis. The torsion axes of the inertial mass torsion beams 3 are perpendicular to those of the driven frame torsion beams 4.

The drive frame 5 is made up of two narrow parts connected to the link beams 7 and a wide part connecting the two narrow parts. The two drive piezoelectric elements 6 are provided on the wide part of the drive frame 5 one at each the narrow part side. The monitor piezoelectric element 9 is provided between the two drive piezoelectric elements 6 on the wide part of the drive frame 5. The drive piezoelectric elements 6 and the monitor piezoelectric element 9 comprise a bulk piezoelectric element or a thin film piezoelectric element. Metal electrodes 14 are formed on both the top and bottom surfaces of the drive piezoelectric elements 6 and the monitor piezoelectric element 9. The metal electrodes are not shown in FIG. 1.

The link beams 7 are parallel to the torsion axes of the driven frame torsion beams 4 and connected to the driven frame 2 near the driven frame torsion beams 4.

The detection piezoresistors 8 comprise, for example, a two-terminal piezoresistor or a four-terminal piezoresistor. The detection piezoresistors 8 are formed at the centers of parts of a silicon substrate which parts constitute the inertial mass torsion beams 3. The detection piezoresistors 8 can be electrically connected to outer circuits through wiring made of a diffusion layer formed on the surface of the silicon substrate on which the inertial mass torsion beams 3, the driven frame 2, the driven frame torsion beams 4 and the connection parts 12 are formed.

The driven frame torsion beams 4 are connected to the support substrate 10 through the connection parts 12 and the anchor 11. In this construction, if there occurs a change in temperature, an unnecessary thermal stress is not applied to the driven frame torsion beams 4 due to a difference in coefficient of linear expansion between the driven frame torsion beams 4 and the support substrate 10 to avoid any adverse influence on the drive properties of the driven frame torsion beams 4.

Next, the operation of this angular rate sensor will be described.

An alternating current voltage is applied across the top and bottom surfaces of the drive piezoelectric elements 6 through the metal electrodes 14 formed on the top and bottom surfaces of the drive piezoelectric elements 6, inducing a bending oscillation of the drive piezoelectric elements 6 in an out-of-plane direction (Z axis direction). The bending oscillation of the drive piezoelectric elements 6 in turn causes a bending oscillation of the drive frame 5 about the side thereof near the anchor part 11 as an axis in an out-of-plane direction (Z axis direction). This bending oscillation is transmitted to the driven frame 2 through the link beam 7. Next, the driven frame torsion beams 4 are distorted and the driven frame 2 rotationally oscillates (reference oscillation) about the torsion axes of the driven frame torsion beams 4 as a rotational axis. As a result, the mass center of the inertial mass 1 oscillates in a simple harmonic motion in the direction parallel to the X axis.

Since the link beams 7 are connected to the driven frame 2 at two positions close to the driven frame torsion beams 4, the driven frame 2 can greatly rotate by a slight bending displacement of the drive frame 5. The closer to the driven frame torsion beams 4 the connection positions between the link beams 7 and the driven frame 2 are, the larger this effect is.

There is a one to one relationship between the bending displacement of the drive frame 5 and the rotational angle of the driven frame 2. The monitor piezoelectric element 9 provided in the drive frame 5 also bending-oscillates together with the drive frame 5. Thus, there is also a one to one relationship between the rotational angle of the driven frame 2 and the bending displacement of the monitor piezoelectric element 9. The displacement amplitude of the rotational oscillation of the driven frame 2 can be maintained constant by keeping the output voltage, constant, from the monitor piezoelectric element 9.

In the state that the mass center of the inertial mass 1 oscillates in a simple harmonic motion, while the entire angular rate sensor rotates about the Z axis, the Coriolis force represented by the following equation (2) acts on the mass center of the inertial mass 1 in the direction parallel to the Y axis. Since the mass center of the inertial mass 1 is positioned below the under surface of the driven frame 2 viewed from the direction parallel to the Y axis, a torque about the torsion axes of the inertial mass torsion beams 3 occurs so that the inertial mass torsion beams 3 are distorted and the inertial mass 1 rotationally oscillates about the torsion axes of the inertial mass torsion beams 3 as a rotational axis.

$$F = 2VM\Omega \tag{2}$$

wherein V represents a rate of the inertial mass 1 in the direction parallel to the X axis, M represents an inertial mass and $\Omega$ represents a rotational angular rate about the Z axis.

The displacement amplitude of the rotational oscillation of the inertial mass 1 is proportional to the maximum absolute value of the Coriolis force F which is proportional to the angular rate $\Omega$. Further, the resistance values of the detection piezoresistors 8 change due to sheering stresses generated at the centers of parts of the silicone substrate constituting the inertial mass torsion beam 3. Thus, a change in resistance values of the detection piezoresistors 8 is measured as a change in voltage to obtain a sensor output proportional to the angular rate.

As stated above, according to the embodiment 1, since the drive frame 5 and driven frame 2 are separately provided and connected by using the link beams 7, the bending oscillation of the drive frame 5 is transmitted to the driven frame 2 through the link beams 7. The displacement amplitude of the rotational oscillation of the driven frame 2 is thus not limited to enhance the sensitivity of the sensor.

Further, according to the embodiment 1, since the link beams 7 are connected to the driven frame 2 near the driven frame torsion beams 4, the driven frame 2 can greatly rotate by a slight bending displacement of the drive frame 5. Thus, with even a small displacement amplitude of the bending oscillation of the drive frame 5, the displacement amplitude of the rotational oscillation of the driven frame 2 is large, thereby allowing the driving of the sensor at a low voltage.

Further, according to the embodiment 1, since the monitor piezoelectric element 9 is provided for monitoring a displacement amplitude of the rotational oscillation of the driven frame 2, the output voltage from the monitor piezoelectric element 9 can be monitored to be maintained constant, thereby maintaining the displacement amplitude of the rotational oscillation of the driven frame 2 constant.

Although the case has been described in this embodiment that the mass center of the inertial mass 1 is positioned below the under surface of the driven frame 2 viewed from the direction parallel to the X axis or the Y axis, the same advantageous effects can be obtained in the case that the mass center is positioned above the upper surface thereof.

Further, although the mass center of the inertial mass 1 is positioned on the line extended from the torsion axes of the driven frame torsion beams 4, viewed from the direction perpendicular to the top and bottom surfaces of the driven frame 2, in this embodiment, it can be shifted from the line.

Further, although the driven frame 2 rotationally oscillates about the torsion axes of the driven frame torsion beams 4 as a rotational axis in this embodiment, it can rotationally oscillates about an axis other than the torsion axes of the driven frame torsion beams 4 as a rotational axis.

Further, although the piezoelectric element is used for monitoring the displacement amplitude of the rotational oscillation of the driven frame 2 in this embodiment, piezoresistors can be formed at the centers of parts of the silicon substrate constituting the driven frame torsion beams 4 to monitor a displacement amplitude of the rotational oscillation of the driven frame 2.

Further, on applying a voltage to the piezoelectric element, it slightly displaces. At this time, even if the voltage impressed is low, a large force is generated. Thus this piezoelectric element is the most suitable for a means for supplying a driving force to the drive frame 5 in the angular rate sensor of this embodiment where the displacement amplitude of the bending oscillation of drive frame 5 may be small.

Embodiment 2

Figure 6:
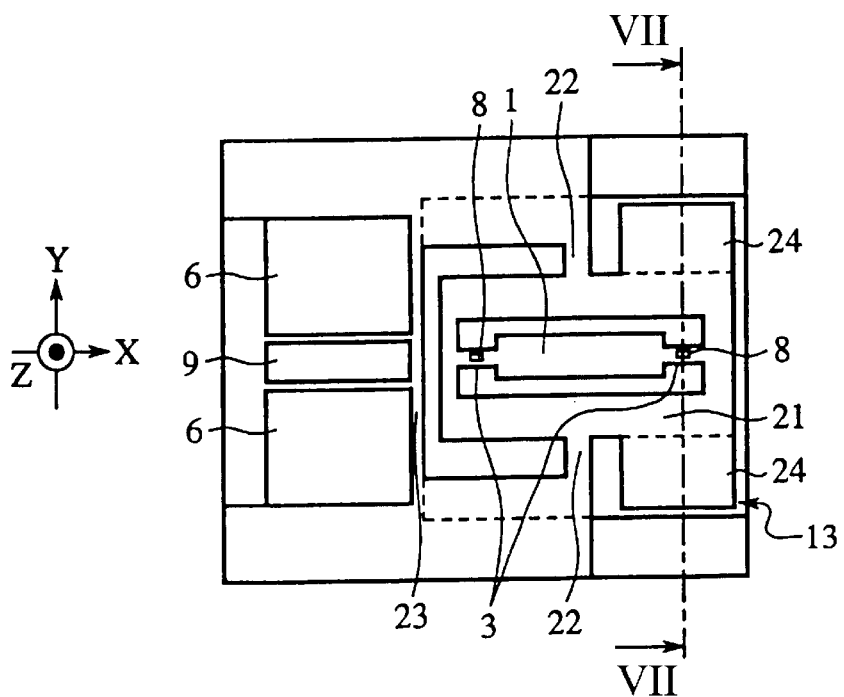
FIG. 6 is a top view showing an angular rate sensor of the embodiment 2 according to the present invention.
Figure 7:
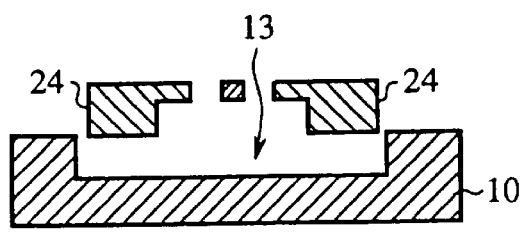
FIG. 7 is a sectional view along the line VII—VII of FIG. 6.

FIG. 6 is a top view showing an angular rate sensor of the embodiment 2 according to the present invention. FIG. 7 is a sectional view along the line VIII—VIII of FIG. 6. In there figures, the reference numeral 21 designates a driven frame surrounding an inertial mass 1; 22 designates a driven frame torsion beam rotatably supporting the driven frame 21 at two opposed positions; 23 designates a drive frame 23 surrounding a half circumference of the driven frame 21 referenced to the line extended from the torsion axes of the driven frame torsion beams 22; and 24 designates a block formed below the driven frame 21.

The two blocks 24 are formed at the opposite side to the drive frame 23 with respect to the driven frame torsion beams 22. The two blocks 24 are symmetrically placed about the line extended from the torsion axes of the inertial masses 3. Thus, the center of gravity of the driven frame 21 is shifted to the side of the block 24 from the line extended from the torsion axes of the driven frame torsion beams 22. That is, the center of gravity is eccentric.

In this embodiment, the driven frame torsion beams 22 are supported by the drive frame 23 and, thereby, function as link beams as shown in the embodiment 1.

In FIGS. 6 and 7, like reference numerals designate like constituent elements as shown in FIGS. 1 to 5. In FIG. 6, metal electrodes formed on the top and bottom surfaces of the drive piezoelectric elements 6 and the monitor piezoelectric element 9 are not shown.

Next, the operation of this angular rate sensor will be described.

In the same manner as the embodiment 1, an alternating current voltage is applied across the top and bottom surfaces of the drive piezoelectric elements 6, causing a bending oscillation of the drive piezoelectric elements 6 and drive frame 23. The bending oscillation is transmitted to the entire driven frame 21 through the driven frame torsion beams 22. Under this situation, since the center of gravity of the driven frame 21 is shifted from the line extended from the torsion axes of the driven frame torsion beams 22 to the blocks 24, a drive inertial force acts on the driven frame 21. As a result, the driven frame torsion beams 22 are distorted and the driven frame 21 rotationally oscillates (reference oscillation) about the torsion axes of the driven frame torsion beams 22 as a rotational axis. Thereafter the angular rate sensor operates in the same manner as the embodiment 1.

As stated above, according to the embodiment 2, the angular rate sensor is constructed such that the drive frame 23 and the driven frame 21 are separately provided, the driven frame torsion beams 22 are supported by the drive frame 23 and the center of gravity of the driven frame 21 is eccentric. Thus, when a bending oscillation of the drive frame 23 is transmitted to the entire driven frame 21 through the driven frame torsion beams 22, a drive inertial force acts on the driven frame 21, causing the rotational oscillation (reference oscillation) of the driven frame 21 about the torsion axes of the driven frame torsion beams 22 as a rotational axis. In the embodiment 2, the driven frame 21 can rotationally oscillate in the more simple construction than that of the embodiment 1.

Embodiment 3

Figure 8:
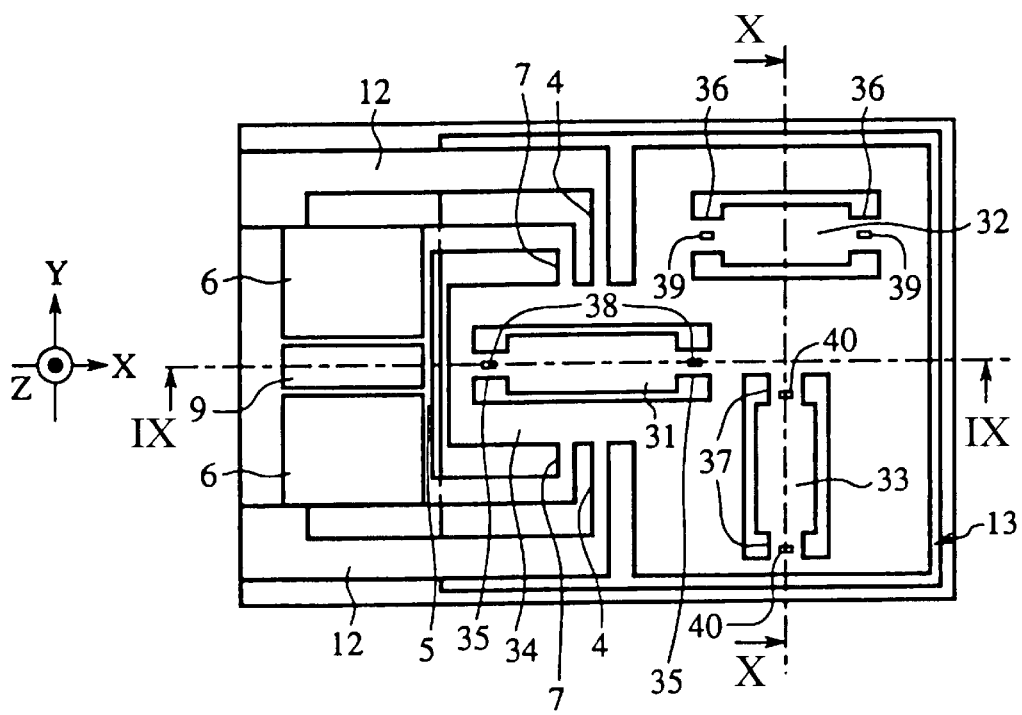
FIG. 8 is a top view showing an angular rate sensor of embodiment 3 according to the present invention.
Figure 9:
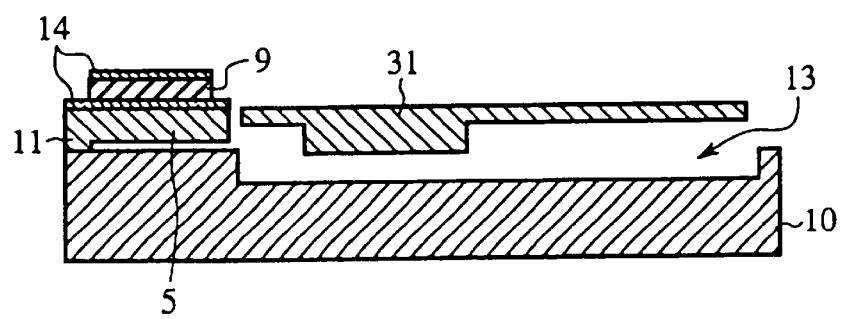
FIG. 9 is a sectional view along the line IX—IX of FIG. 8.
Figure 10:
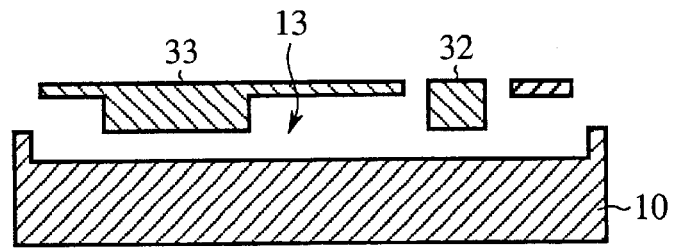
FIG. 10 is a sectional view along the line X—X of FIG. 8.

FIG. 8 is a top view showing an angular rate sensor of the embodiment 3 according to the present invention. FIG. 9 is a sectional view along the line IX—IX of FIG. 8. FIG. 10 is a sectional view along the line X—X of FIG. 8. In these figures, the reference numeral 31 designates a first inertial mass; 32 designates a second inertial mass; 33 designates a third inertial mass; 34 designates a driven frame surrounding the first to third inertial masses 31, 32, 33; 35 designates a first inertial mass torsion beam rotatably supporting the first inertial mass 31 at two opposed positions; 36 designates a second inertial mass torsion beam rotatably supporting the second inertial mass 32 at two opposed positions; 37 designates a third inertial mass torsion beam rotatably supporting the third inertial mass 33 at two opposed positions; 38 designates a first detection piezoresistor (detection means) for detecting the displacement amplitude of a rotational oscillation of the first inertial mass 31; 39 designates a second detection piezoresistor (detection means) for detecting the displacement amplitude of a rotational oscillation of the second inertial mass 32; and 40 designates a third detection piezoresistor (detection means) for detecting the displacement amplitude of a rotational oscillation of the third inertial mass 33.

The mass center of the first inertial mass 31 is positioned on the line extended from the torsion axes of the driven frame torsion beams 4, viewed from the direction perpendicular to the top and bottom surfaces of the driven frame 34, while it is positioned below the bottom surface of the driven frame 34, viewed from the direction parallel to the top and bottom surfaces of the driven frame 34. That is, in the state as shown in FIG. 8, the mass center of the first inertial mass 31 is positioned on the line extended from the torsion axes of the driven frame torsion beams 4, viewed from the direction parallel to the Z axis, while it is positioned below the bottom surface of the driven frame 34, viewed from the direction parallel to the X axis or the Y axis. The torsion axes of the first inertial mass torsion beams 35 are parallel to the X axis and perpendicular to the torsion axes of the driven frame torsion beams 4. The first detection piezoresistors 38 are formed at the centers of parts of the silicone substrate constituting the first inertial mass torsion beams 35. The first inertial mass 31, the first inertial mass torsion beams 35 and the first detection piezoresistors 38 constitute a first rotational angular rate detection part for detecting a rotational angular rate about the Z axis.

The mass center of the second inertial mass 32 is shifted from the line extended from the torsion axes of the driven frame torsion beams 4 to the opposite side to the drive frame 5, viewed from the direction perpendicular to the top and bottom surfaces of the driven frame 34, while it is positioned below the bottom surface of the driven frame 34, viewed from the direction parallel to the top and bottom surfaces of the driven frame 34. That is, in the state as shown in FIG. 8, the mass center of the second inertial mass 32 is shifted from the line extended from the torsion axes of the driven frame torsion beams 4 to the opposite side to the drive frame 5, viewed from the direction parallel to the Z axis, while it is positioned below the bottom surface of the driven frame 34, viewed from the direction parallel to the X axis or the Y axis. The torsion axes of the second inertial mass torsion beams 36 are parallel to the X axis and perpendicular to the torsion axes of the driven frame torsion beams 4. The second detection peizoresistors 39 are formed at the centers of parts of the silicone substrate constituting the second inertial mass torsion beams 35. The second inertial mass 32, the second inertial mass torsion beams 36 and the second detection piezoresistors 39 constitute a second rotational angular rate detection part for detecting a rotational angular rate about the X axis.

The mass center of the third inertial mass 33 is shifted from the line extended from the torsion axes of the driven frame torsion beams 4 to the opposite side to the drive frame 5, viewed from the direction perpendicular to the top and bottom surfaces of the driven frame 34, while it is positioned below the bottom surface of the driven frame 34, viewed from the direction parallel to the top and bottom surfaces of the driven frame 34. That is, in the state as shown in FIG. 8, the mass center of the third inertial mass 33 is shifted from the line extended from the torsion axes of the driven frame torsion beams 4 to the opposite side to the drive frame 5, viewed from the direction parallel to the Z axis, while it is positioned below the bottom surface of the driven frame 34, viewed from the direction parallel to the X axis or the Y axis. The torsion axes of the third inertial mass torsion beams 37 are parallel to the Y axis and parallel to the torsion axes of the driven frame torsion beams 4. The third detection piezoresistors 40 are formed at the centers of parts of the silicone substrate constituting the third inertial mass torsion beams 37. The third inertial mass 33, the third inertial mass torsion beams 37 and the third detection piezoresistors 40 constitute a third rotational angular rate detection part for detecting a rotational angular rate about the Y axis.

In FIGS. 8 to 10, like reference numerals designate like constituent elements as shown in FIGS. 1 to 5. In FIG. 8, metal electrodes formed on the top and bottom surfaces of drive piezoelectric elements 6 and the monitor piezoelectric element 9 are not shown.

Next, the operation of this angular rate sensor will be described.

In the same manner as the embodiment 1, an alternating current voltage is applied across the top and bottom surfaces of the drive piezoelectric elements 6, causing the bending oscillation of the drive piezoelectric elements 6 and drive frame 5. The bending oscillation is transmitted to the driven frame 34 through the link beams 7. The driven frame 34 rotationally oscillates (reference oscillation) about the torsion axes of the driven frame torsion beams 4 as a rotational axis. As a result, the mass center of the first inertial mass 31 oscillates in a simple harmonic motion in the direction parallel to the X axis, while the mass centers of the second and third inertial masses 32, 33 oscillate in a simple harmonic motion in the direction parallel to the Z axis.

In this state, when the entire angular rate sensor rotates about the Z axis, the first inertial mass 31 rotationally oscillates about the torsion axes of the first inertial mass torsion beams 35 as a rotational axis. A change in resistance values of the first detection piezoresistors 38 is measured as a change in voltage to obtain a sensor output proportional to a rotational angular rate about the Z axis.

When the entire angular rate sensor rotates about the X axis, the second inertial mass 32 rotationally oscillates about the torsion axes of the second inertial mass torsion beams 36 as a rotational axis. A change in resistance values of the second detection piezoresistors 39 is measured as a change in voltage to obtain a sensor output proportional to a rotational angular rate about the X axis.

If the entire angular rate sensor rotates about the Y axis, the third inertial mass 33 rotationally oscillates about the torsion axes of the third inertial mass torsion beams 37 as a rotational axis. A change in resistance values of the third detection piezoresistors 40 is measured as a change in voltage to obtain a sensor output proportional to a rotational angular rate about the Y axis.

As stated above, according to the embodiment 3, since there are provided the first rotational angular rate detection part for detecting a rotational angular rate about the Z axis, the second rotational angular rate detection part for detecting a rotational angular rate about the X axis, and the third rotational angular rate detection part for detecting a rotational angular rate about the Y axis, angular rates of rotation about the three axes can be detected.

Although the case has been described in this embodiment that the mass centers of the first to third inertial masses 31, 32, 33 are positioned below the bottom surface of the driven frame 34 viewed from the direction parallel to the X axis or the Y axis, the same advantageous effects can be obtained in the case that they are positioned above the top surface thereof.

Further, although the case has been described in this embodiment that the construction provided with the first to third rotational angular rate detection parts is applied to the embodiment 1, the same advantageous effects can be obtained in the case that such construction is applied to the embodiment 2.

Further, although the case has been described in this embodiment that the first to third rotational angular rate detection parts are provided, two rotational angular rates about two axes can be detected in the case that any two of the above three rotational angular rate detection. parts are provided and a rotational angular rate about one axis can be detected in the case that any one of the above three rotational angular rate detection parts is provided. The angular rate sensor of the embodiment 1 corresponds to the case that only the first rotational angular rate detection part is provided.

Embodiment 4

Figure 11:
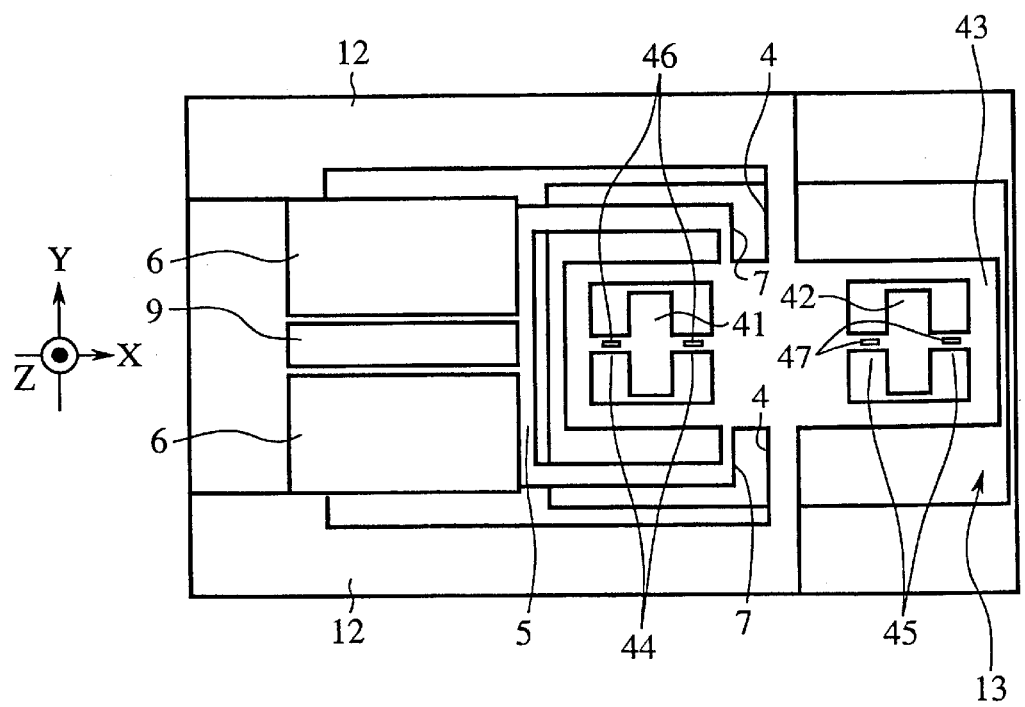
FIG. 11 is a top view showing an angular rate sensor of embodiment 4 according to the present invention.

FIG. 11 is a top view showing an angular rate sensor of the embodiment 4 according to the present invention. In this figure, the reference numeral 41 designates a first inertial mass; 42 designates a second inertial mass; 43 designates a driven frame surrounding the first inertial mass 41 and the second inertial mass 42; 44 designates a first inertial mass torsion beam rotatably supporting the first inertial mass 41 at two opposed positions; 45 designates a second inertial mass torsion beam rotatably supporting the second inertial mass 42 at two opposed positions; 46 designates a first detection piezoresistor (detection means) for detecting the displacement amplitude of a rotational oscillation of the first inertial mass 41; and 47 designates a second detection piezoresistor (detection means) for detecting the displacement amplitude of a rotational oscillation of the second inertial mass 42.

The mass centers of the first and second inertial masses 41, 42 are symmetrically placed about the line extended from the torsion axes of the driven frame torsion beams 4 viewed from the direction perpendicular to the top and bottom surfaces of the driven frame 43, and they are placed below the bottom surface of the driven frame 43 viewed from the direction parallel to the top and bottom surfaces of the driven frame 43. That is, in the sate as shown in FIG. 11, the mass centers of the first and second inertial masses 41, 42 are symmetrically placed about the line extended from the torsion axes of the driven frame torsion beams 4 viewed from the direction parallel to the Z axis, and they are placed below the bottom surface of the driven frame 43 viewed from the direction parallel to the X axis and the Y axis. The size of the first inertial mass 41 is the same as that of the second inertial mass 42.

The torsion axes of the first and second inertial mass torsion beams 44, 45 are parallel to the X axis and perpendicular to the torsion axes of the driven frame torsion beams 4.

The first detection piezoresistors 46 are formed at the centers of parts of the silicon substrate constituting the first inertial mass torsion beams 44, while the second detection piezoresistors 47 are formed at the centers of parts of the silicon substrate constituting the second inertial mass torsion beams 45.

In FIG. 11, like reference numerals designate like constituent elements as shown in FIGS. 1 to 5. In FIG. 11, metal electrodes formed on the top and bottom surfaces of drive piezoelectric elements 6 and the monitor piezoelectric element 9 are not shown.

Next, the operation of this angular rate sensor will be described.

In the same manner as the embodiment 1, an alternating current voltage is applied across the top and bottom surfaces of the drive piezoelectric elements 6, causing a bending oscillation of the drive piezoelectric elements 6 and the drive frame 5. This bending oscillation is transmitted to the driven frame 43 through the link beams 7. Accordingly, the driven frame 43 rotationally oscillates (reference oscillation) about the torsion axes of the driven frame torsion beams 4 as a rotational axis. As a result, the mass centers of the first and second inertial masses 41, 42 oscillate in a simple harmonic motion in the direction parallel to the Z axis.

In this state, when the entire angular rate sensor rotates about the X axis, the first inertial mass 41 rotationally oscillates about the torsion axes of the first inertial mass torsion beams 44 and the second inertial mass 42 rotationally oscillates about the torsion axes of the second inertial mass torsion beams 45.

The mass centers of the first and second inertial masses 41, 42 are symmetrically placed about the line extended from the torsion axes of the driven frame torsion beams 4, viewed from the direction parallel to the Z axis. Thus, when the first and second inertial masses 41, 42 oscillate in a simple harmonic motion in the direction parallel to the Z axis, rates in the direction parallel to the Z axis of the first and second inertial masses 41, 42 are equal in absolute value and of opposite sign. Accordingly, the Coriolis forces acting on the mass centers of the first and second inertial masses 41, 42 are equal in absolute value and of opposite sign. As a result, the first and second inertial masses 41, 42 rotationally oscillate in the phases different from each other by 180 degrees. Changes in resistance values of the first and second detection piezoresistors 46, 47 are measured as changes in voltage. The calculation of differential voltage gives a sensor output without any noise component of common mode voltage. For example, noise components caused by the oscillation of the first and second inertial masses 41, 42 due to acceleration in the direction parallel to the Y axis can be removed. The absolute values of rates in the direction parallel to the Z axis of the first and second inertial masses 41, 42 increase proportionally to the distances from the line extended from the torsion axes of the driven frame beams 4 to the mass centers of the first and second inertial masses 41, 42 when the mass centers thereof oscillate in a simple harmonic motion in the direction parallel to the Z axis. Thereby the sensitivity of the sensor increases.

As stated above, according to the embodiment 4, the angular rate sensor is constructed such that the mass centers of the first and second inertial masses 41, 42 are symmetrically placed about the line extended from the torsion axes of the driven frame torsion beams 4, viewed from the direction perpendicular to the top and bottom surfaces of the driven frame 43. Thus, in the state that the driven frame 43 rotationally oscillates, when the entire angular rate sensor rotates about the X axis, the first and second inertial masses 41, 42 rotationally oscillate in phases different from each other by 180 degrees, allowing the detection of an angular rate with high sensitivity.

Although the case has been described in this embodiment that the mass centers of the first and second inertial masses 41, 42 are positioned below the bottom surface of the driven frame 43 viewed from the direction parallel to the X axis or the Y axis, the same advantageous effects can be obtained in the case that they are positioned above the top surface thereof.

Further, although the case has been described in this embodiment that the torsion axes of the first and second inertial mass torsion beams 44, 45 are perpendicular to the torsion axes of the driven frame torsion beams 4, the same advantageous effects can be obtained in the case that they are parallel thereto. In the later case, the angular rate sensor detects a rotational angular rate about the Y axis.

Further, although the case has been described in this embodiment that the construction where the mass centers of the first and second inertial masses 41, 42 are symmetrically positioned about the line extended from the torsion axes of the driven frame torsion beams 4 is applied to the embodiment 1, the same advantageous effects can be obtained in the case that such construction is applied to the embodiment 2.

Embodiment 5

Figure 12:
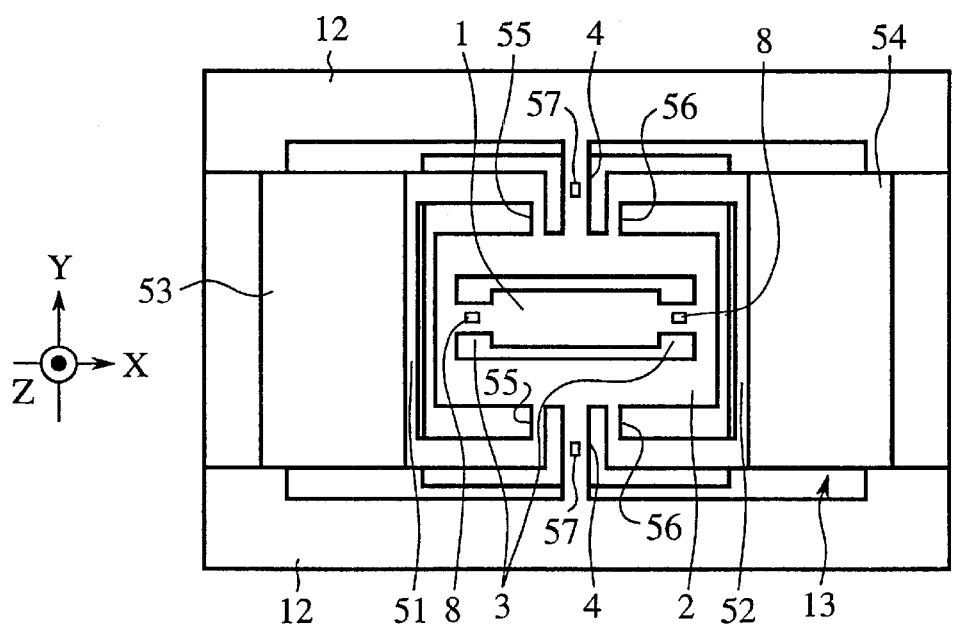
FIG. 12 is a top view showing an angular rate sensor of embodiment 5 according to the present invention.

FIG. 12 is a top view showing an angular rate sensor of the embodiment 5 according to the present invention. In this figure, the reference numeral 51 designates a first drive frame surrounding a half circumference of a driven frame 2 referenced to the line extended from the torsion axes of the driven frame torsion beams 4; 52 designates a second drive frame surrounding the other half circumference of the driven frame 2; 53 designates a first drive piezoelectric element (driving force generation means) for giving a driving force to the first drive frame 51 to cause a bending oscillation of the first drive frame 51 in an out-of-plane direction (Z axis); 54 designates a second drive piezoelectric element (driving force generation means) for giving a driving force to the second drive frame 52 to cause a bending oscillation of the second drive frame 52 in an out-of-plane direction (Z axis); 55 designates a first link beam connecting the driven frame 2 with the first drive frame 51 so that the bending oscillation of the first drive frame 51 is transmitted to the driven frame 2; 56 designates a second link beam connecting the driven frame 2 with the second drive frame 52 so that the bending oscillation of the second drive frame 52 is transmitted to the driven frame 2; and 57 designates a monitor piezoresistor (monitor means) for monitoring the displacement amplitude of the rotational oscillation of the driven frame 2.

The first drive piezoelectric element 53 is provided on the wide part of the first drive frame 51, while the second drive piezoelectric element 54 is provided on the wide part of the second drive frame 52. The monitor piezoresistors 57 are formed at the centers of parts of a silicone substrate which parts constitute the driven frame torsion beams 4.

In FIG. 12, like reference numerals designate like constituent elements as shown in FIGS. 1 to 5. In FIG. 12, metal electrodes formed on the top and bottom surfaces of the drive piezoelectric elements 53, 54 are not shown.

Next, the operation of this angular rate sensor will be described.

An alternating current voltage is applied across the top and bottom surfaces of the first drive piezoelectric element 53 and another voltage is applied across the top and bottom surfaces of the second drive piezoelectric element 54 whose phase is shifted 180 degrees with respect to that of the potential for the first drive piezoelectric element 53, causing a bending oscillation of the first and second drive piezoelectric elements 53, 54 in an out-of-plane direction (Z axis) in phases different by 180 degrees from each other. The bending oscillation of the first and second drive piezoelectric elements 53, 54, in turn, cause the bending of the first and second drive frames 51, 52 in an out-of-plane direction (Z axis) in phases different by 180 degrees from each other. This bending oscillation is transmitted to the driven frame 2 through the first and second link beams 55, 56. As a result, the driven frame 2 stably rotationally oscillates (reference oscillation) about the torsion axes of the driven frame torsion beams 4 as a rotational axis in the push-pull system. A change in resistance values of the monitor piezoresistors 57 is measured as a change in voltage. The change is maintained to be constant to obtain the constant displacement amplitude of the rotational oscillation of the driven frame 2. Thereafter, the angular rate sensor operates in the same manner as the embodiment 1.

As stated above, according to the embodiment 5, the angular rate sensor is constructed such that the first drive frame 51 surrounding a half circumference of the driven frame 2 referenced to the line extended from the torsion axes of the driven frame torsion beams 4 and the second drive frame 52 surrounding the other half circumference thereof are provided; the driven frame 2 is connected to the first drive frame 51 through the first link beams 55; and the driven frame 2 is connected to the second drive frame 52 through the second link beams 56. Thus, the bending oscillation of the first and second drive frames 51, 52 in phases different by 180 degrees from each other leads to a stable rotational oscillation of the driven frame 2 about the torsion axes of the driven frame torsion beams 4 as a rotational axis, thereby allowing the detection of an angular rate with high sensitivity.

In addition, according to the embodiment 5, since the driven frame 2 is supported at six positions, it is resistant to outer disturbances.

Although the case has been described in this embodiment that the construction where the first drive frame 51 surrounding a half circumference of the driven frame 2 referenced to the line extended from the torsion axes of the driven frame torsion beams 4 and the second drive frame 52 surrounding the other half circumference thereof are provided is applied to the embodiment 1, the same advantageous effects can be obtained in the case that such construction is applied to the embodiment 2. However, in the later case, the phases of the bending oscillations between the first and second drive frames are common.

Further, when the driven frame 2 is connected to the first and second driven frames 51, 52 through the first and second link beams 55, 56 and the driven frame 2 rotationally oscillates in the push-pull system, the driven frame torsion beams 4 is not necessary because the driven frame torsion beams 4 generate an unnecessary torsion torque.

Embodiment 6

Figure 13:
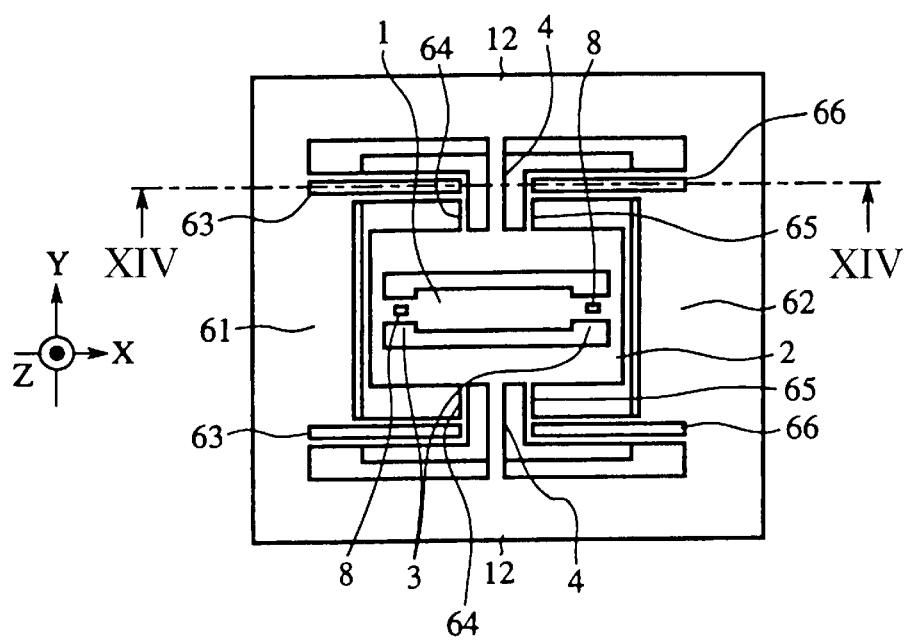
FIG. 13 is a top view showing an angular rate sensor of embodiment 6 according to the present invention.
Figure 14:
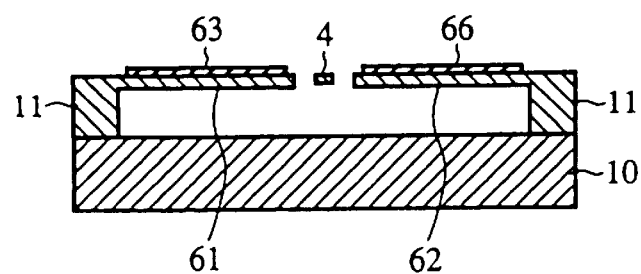
FIG. 14 is a sectional view along the line XIV—XIV of FIG. 13.

FIG. 13 is a top view showing an angular rate sensor of the embodiment 6 according to the present invention. FIG. 14 is a sectional view along the line XIV—XIV of FIG. 13. In these figures, the reference numeral 61 designates a first drive frame surrounding a half circumference of a driven frame 2 referenced to the line extended from the torsion axes of the driven frame torsion beams 4; 62 designates a second drive frame surrounding the other half circumference of the driven frame 2; 63 designates a first drive piezoelectric element (driving force generation means) for giving a driving force to the first drive frame 61 to cause a bending oscillation of the first drive frame 61 in an out-of-plane direction (Z axis); 64 designates a first link beam connecting the driven frame 2 with the first drive frame 61 so that the bending oscillation of the first drive frame 61 is transmitted to the driven frame 2; 65 designates a second link beam connecting the driven frame 2 with the second drive frame 62 so that the bending oscillation of the second drive frame 62 is transmitted to the driven frame 2; and 66 designates a monitor piezoelectric element (monitor means) for monitoring the displacement amplitude of the rotational oscillation of the driven frame 2.

The first and second drive frames 61, 62 are of thin type. Two drive piezoelectric elements 63 are provided each on two narrow parts of the first drive frame 61. The two monitor piezoelectric elements 66 are provided each on two narrow parts of the second drive frame 62. Since the first drive frame 61 is of thin type, a bending oscillation of the drive piezoelectric elements 63 provided on two narrow parts of the first drive frame 61 can easily cause a bending oscillation of the first drive frame 61 together with the first drive piezoelectric elements 63 and then a rotational oscillation of the driven frame 2. This rotational oscillation is easily transmitted to the second drive frame 62 through the second link beams 65, resulting in a bending oscillation of the second drive frame 62.

In FIGS. 13 and 14, like reference numerals designate like constituent elements as shown in FIGS. 1 to 5.

Next, the operation of this angular rate sensor will be described.

In a manner similar to the embodiment 1, an alternating current voltage is applied across the top and bottom surfaces of the drive piezoelectric elements 63, causing a bending oscillation of the drive piezoelectric elements 63 and the first drive frame 61. The bending oscillation is transmitted to the driven frame 2 through the first link beams 64. As a result, the driven frame 2 rotationally oscillates (reference oscillation) about the torsion axes of the driven frame torsion beams 4 as a rotational axis. Further, this rotational oscillation is transmitted to the second drive frame 62 through the second link beams 65, resulting in a bending oscillation of the second drive frame 62 together with the monitor piezoelectric elements 66 in an out-of-plane direction (Z axis). There is the one to one relationship between the rotational angular rate of the driven frame 2 and the displacement amplitude of the monitor piezoelectric elements 66. Thus, when an output voltage from the monitor piezoelectric elements 66 is monitored to be maintained constant, the displacement amplitude of the rotational oscillation of the driven frame 2 can be maintained constant. Thereafter, the angular rate sensor operates in the same manner as the embodiment 1.

As stated above, according to the embodiment 6, the angular rate sensor is constructed such that the drive piezoelectric elements 63 are provided on the narrow parts of the first drive frame 61 and the monitor piezoelectric elements 66 are provided on the narrow parts of the second drive frame 62. Thus, the size of the entire angular rate sensor can be decreased by making the wide part of the first drive frame 61 small.

In addition, according to the embodiment 6, similarly to the embodiment 5, since the driven frame 2 is supported at six positions, it is resistant to outer disturbances.

The case has been described in this embodiment that the monitor piezoelectric elements 66 are provided on the narrow parts of the-second frame 62, the same advantageous effects can be obtained in the case that drive piezoelectric elements for giving a driving force to the second drive frame 62 to cause a bending oscillation of the second drive frame 62 in an out-of-plane direction (Z axis) are provided instead of the monitor piezoelectric elements 66 and piezoresistors are formed at the centers of parts of a silicon substrate constituting the driven frame torsion beams 4. In the later case, the driven frame 2 rotationally oscillates in the push-pull system.

Further, although piezoelectric elements are used in this embodiment to supply a driving force to cause a bending oscillation of the drive frame in an out-of-plane direction (Z axis), piezoresistors may be formed in the narrow parts of the drive frame so that thermal expansion of the piezoelectric elements generated by applying an alternating current thereto is used to supply the driving force to the drive frame.

Further, although the case has been described in this embodiment that piezoelectric elements are provided or piezoresistors are formed in the narrow parts of the drive frame, the same advantageous effects can be obtained in the case that piezoelectric elements are provided or piezoresistors are formed in the link beams connecting the driven frame with the drive frame.

Further, although the case has been described in this embodiment that the construction where piezoelectric elements are provided or piezoresistors are formed in the narrow parts of the drive frame is applied to the embodiment 5 which is an example of modifications of embodiment 1, the same advantageous effects can be obtained in the case that such construction is applied to an example of modifications of the embodiment 2.

Embodiment 7

Figure 15:
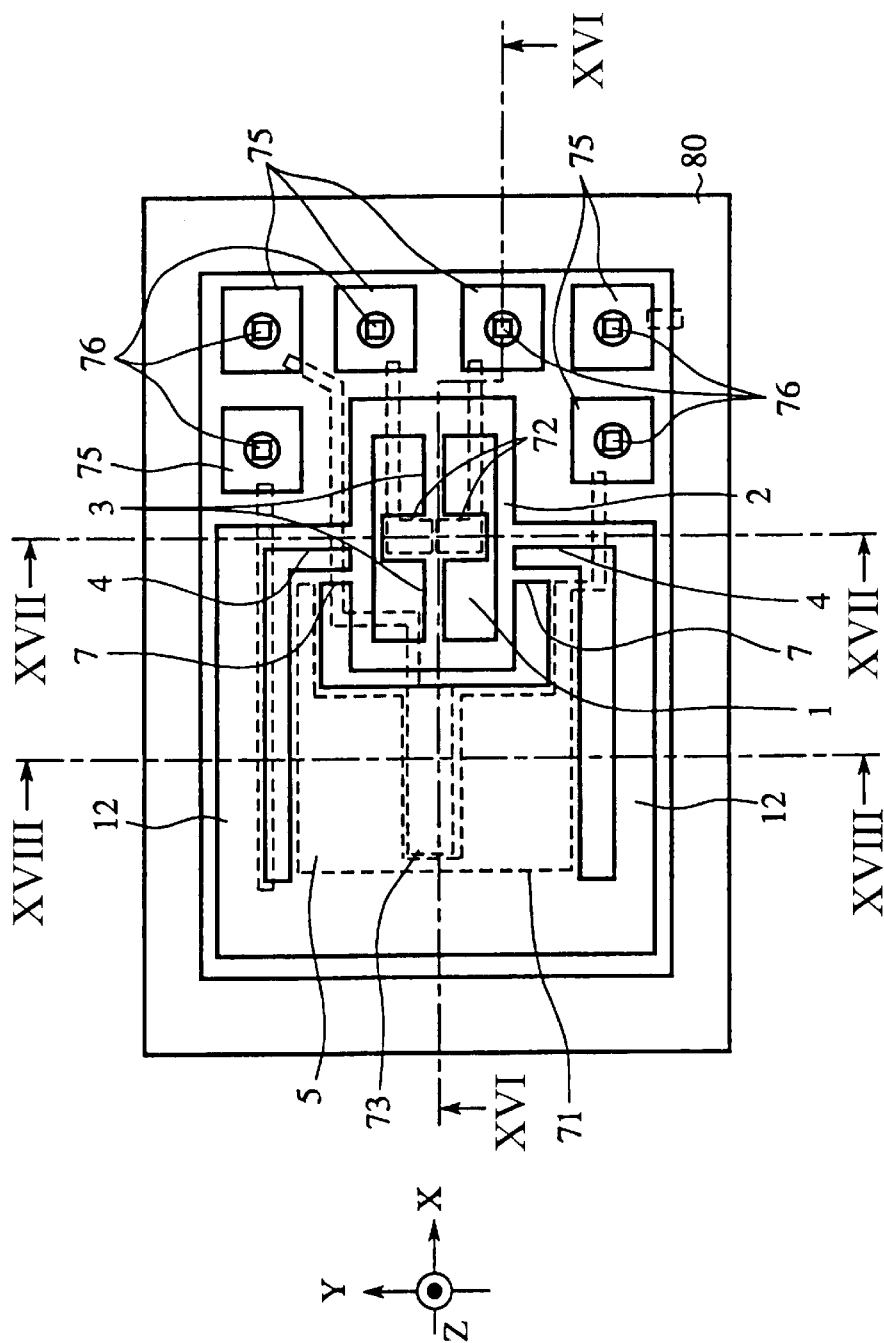
FIG. 15 is a top view showing an angular rate sensor of embodiment 7 according to the present invention.
Figure 16:
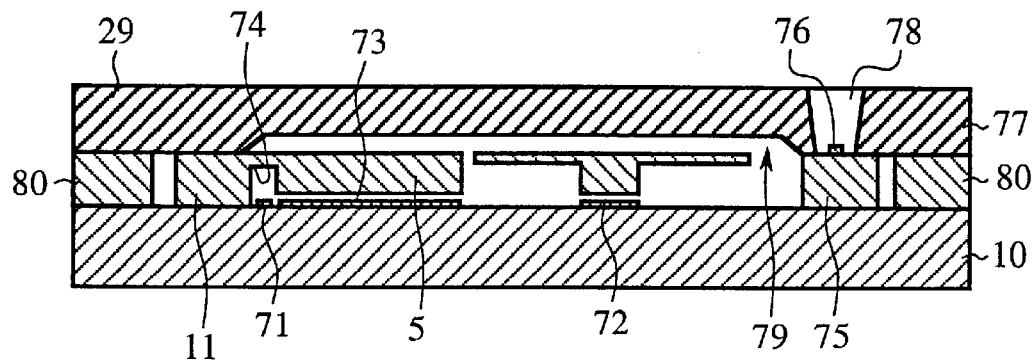
FIG. 16 is a sectional view along the line XVI—XVI of FIG. 15.
Figure 17:
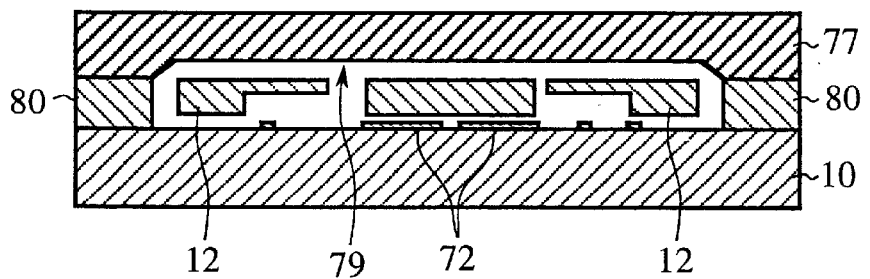
FIG. 17 is a sectional view along the line XVII—XVII of FIG. 15.
Figure 18:
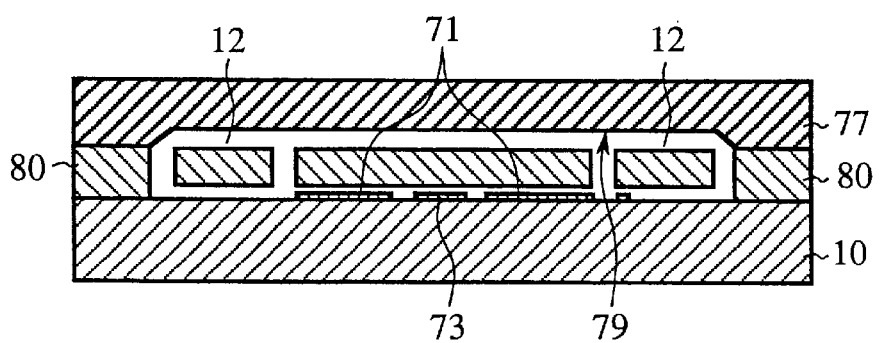
FIG. 18 is a sectional view along the line XVIII—XVIII of FIG. 15.
Figure 19:
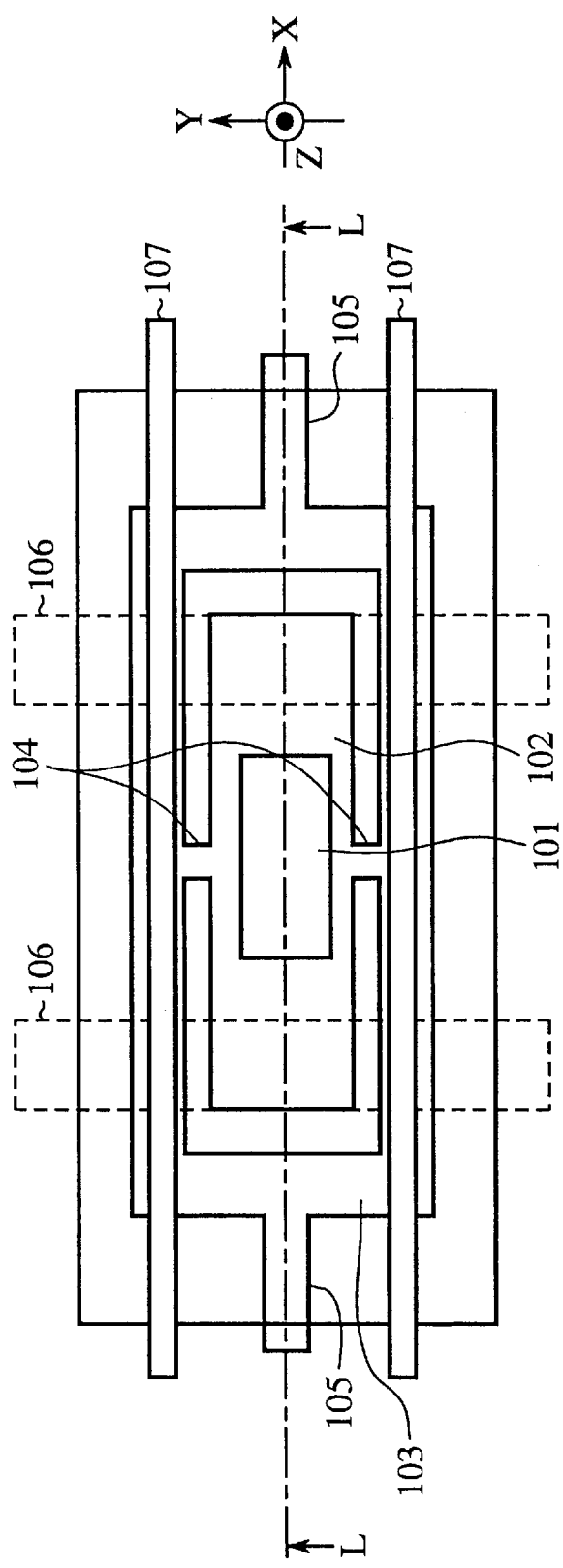
FIG. 19 is a top view showing a conventional angular rate sensor.
Figure 20:
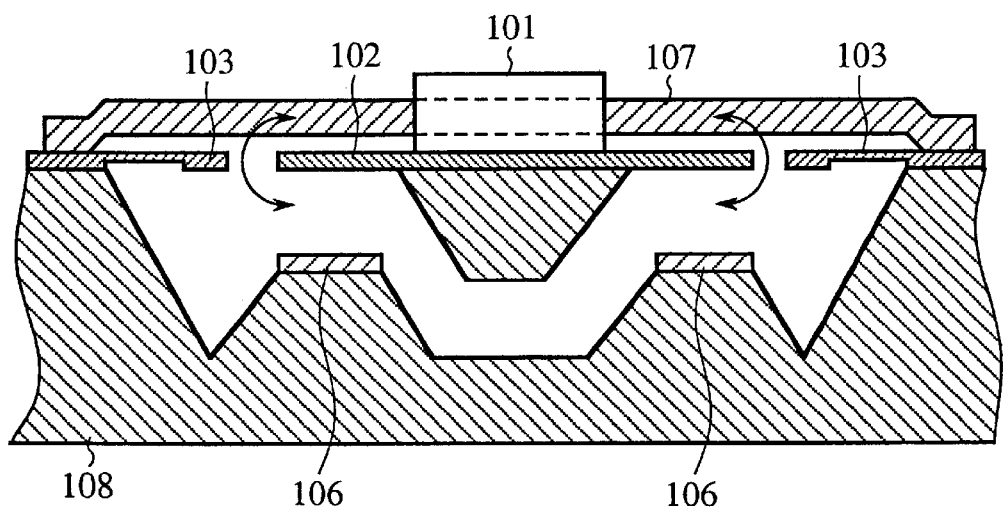
FIG. 20 is a sectional view along the line XX—XX of FIG. 19.

FIG. 15 is a top view showing an angular rate sensor of the embodiment 7 according to the present invention. FIG. 16 is a sectional view along the line XVI—XVI of FIG. 15. FIG. 17 is a sectional view along the line XVII—XVII of FIG. 15. FIG. 18 is a sectional view along the line XVIII—XVIII of FIG. 15. In these figures, the reference numeral 71 designates a drive electrode (drive force generation means) for giving a driving force to a drive frame 5 to cause a bending oscillation of the drive frame 5 in an out-of-plane direction; 72 designates a detection electrode (detection means) for detecting the displacement amplitude of a rotational oscillation of an inertial mass 1; 73 designates a monitor electrode (monitor means) for monitoring the displacement amplitude of a rotational oscillation of a driven frame 2; 74 designates a thin part of the drive frame 5 formed near the end thereof adjacent to an anchor part 11 for easy bending oscillation of the drive frame 5.

The drive electrode 71 and the monitor electrode 73 are provided on a support substrate 10 right under the drive frame 5. The monitor electrode 73 has a rectangular shape and the drive electrode 71 has a shape surrounding three sides of the monitor electrode 73. The combined shape of the drive electrode 71 and the monitor electrode 73 is roughly coincident with the shape of the drive frame 5. The two detection electrodes 72 are aligned on the support substrate 10 right under the inertial mass 1 in the direction of the torsion axes of the driven frame torsion beams 4.

In FIGS. 15 to 18, like reference numerals designate like constituent elements as shown in FIGS. 1 to 5.

Next, the operation of this angular rate sensor will be described.

A direct current voltage is applied to the drive frame 5 and the drive electrode 71, and an alternating current voltage is additionally applied to the drive electrode 71, causing a bending oscillation of the drive frame 5 in an out-of-plane direction (Z axis) at the same frequency as that of the alternating current voltage applied to the drive electrode 71. The bending oscillation is transmitted to the driven frame 2 through the link beams 7. Accordingly, the driven frame 2 rotationally oscillates (reference oscillation) about the torsion axes of the driven frame torsion beams 4 as a rotational axis. As a result, the mass center of the inertial mass 1 oscillates in a simple harmonic motion in the direction parallel to the X axis.

The bending oscillation of the drive frame 5 changes the electrostatic capacity between the drive frame 5 and drive electrode 71. Thus, the displacement amplitude of the rotational oscillation of the driven frame 2 can be maintained constant by converting this change in electrostatic capacity to a voltage and maintaining the voltage constant.

In the state that the mass center of the inertial mss 1 oscillates in a simple harmonic motion, when the entire angular rate sensor rotates about the Z axis, the inertial mass 1 rotationally oscillates about the torsion axes of the inertial mass torsion beams 3.

When the inertial mass 1 rotationally oscillates, the electrostatic capacity between the inertial mass 1 and the detection electrode 72 increases while the electrostatic capacity between the inertial mass 1 and the other detection electrode 72 decreases. The difference between these two electrostatic capacities is converted to the voltage to obtain a sensor output proportional to an angular rate.

As stated above, according to the embodiment 7, although the means for giving a driving force to the drive frame 5, the means for detecting the displacement amplitude of the rotational oscillation of the inertial mass 1, and the means for monitoring the displacement amplitude of the rotational oscillation of the driven frame 2 are different from those of the embodiment 1, the basic construction is the same as that of the embodiment 1. Thus, the same advantageous effects as those of the embodiment 1 can be obtained.

Although the case has been described in this embodiment that construction where means for giving a driving force to the drive frame, means for detecting the displacement amplitude of the rotational oscillation of the inertial mass and means for monitoring the displacement amplitude of the rotational oscillation of the driven frame are all electrodes is applied to the embodiment 1, the same advantageous effects can be obtained in the case that such construction is applied to the embodiment 2.

Further, in FIGS. 15 to 18, an exemplary of the package of the angular rate sensor is also shown. In these figures, the reference numeral 75 designates an electrode island for connecting the angular rate sensor to an outer circuit; 76 designates an electrode pad provided on the top surface of the electrode island 75; 77 designates an upper substrate with holes 78 for connecting the electrode pads 76 to outer circuits and a concave part 79 for leaving an internal space after packaging; 80 designates a supplementary support part interposed between the support substrate 10 and the upper substrate 77 and defining the outside shape of the package. In FIG. 15, the upper substrate 77 is not shown.

Six electrode islands 75 are provided. Each of the electrode islands 75 is connected to any one of the anchor part 11, the drive electrode 71, the two detection electrodes 72, the monitor electrode 73 and the supplementary support part 80 through a metal wiring formed on the support substrate 10.

The electrode islands 75 and the supplementary support part 8 are formed by processing the silicone substrate constituting the inertial mass 1 and the like. The upper substrate 77 is made of, for example, silicon and pyrex glass with a coefficient of linear expansion similar to that of silicon.

The junction between the supplementary support part 80 and the upper substrate 77, and that between the electrode islands 75 and the upper substrate 77 can be made by suitable ways such as direct silicon junction and anode junction. The inside of the package is therefore completely sealed from the outside to provide an angular rate sensor with high reliability.

Moreover, in the above all embodiments, there may be provided a permanent magnetic film for giving a driving force on the drive frame and an electromagnetic coil outside the drive frame so that an interaction therebetween (Lorentz's force) causes the bending oscillation of the drive frame. Alternatively, there may be provided a permanent magnet outside the drive frame and a flat electromagnet on the drive frame so that an interaction therebetween (Lorentz's force) causes the bending oscillation of the drive frame.

It is understood by those skilled in the art that the foregoing description is for illustration and not limitation of the invention, and various changes and modifications may be made in the invention without departing from the spirit and scope thereof.

What is claimed is:

1. An angular rate sensor comprising:
   a substrate;
   an inertial mass;
   a driven frame surrounding the inertial mass;
   inertial mass torsion beams connecting the inertial mass with the driven frame and rotatably supporting the inertial mass at two opposed positions;
   driven frame torsion beams connected to and rotatably supporting the driven frame at two opposed positions;
   a drive frame surrounding a half circumference of the driven frame with reference to a line extending along torsion axes of the driven frame torsion beams and including
      an anchor portion connecting the drive frame to the substrate and
      connecting portions transverse to and flexibly connecting the driven frame torsion beams to the anchor portion;
   driving force generation means for producing a driving force causing bending oscillation of the drive frame in an out-of-plane direction;
   link beams connecting the driven frame to the drive frame at two opposite positions proximate positions at which the driven frame torsion beams are connected to the driven frame; and
   detection means for detecting displacement amplitude of a rotational oscillation of the inertial mass.

2. An angular rate sensor comprising:
   a substrate;
   an inertial mass;
   a driven frame surrounding the inertial mass;
   inertial mass torsion beams connecting the inertial mass with the driven frame and rotatably supporting the inertial mass at two opposed positions;
   driven frame torsion beams connected to and rotatably supporting the driven frame at two opposed positions;
   a drive frame surrounding a half circumference of the driven frame with reference to a line extending along torsion axes of the driven frame torsion beams and including
      an anchor portion connecting the drive frame to the substrate and
      connecting portions transverse to and flexibly connecting the driven frame torsion beams to the anchor portion;
   driving force generation means for producing a driving force causing bending oscillation of the drive frame in an out-of-plane direction; and
   detection means for detecting displacement amplitude of a rotational oscillation of the inertial mass, wherein a center of gravity of the driven frame is located on a side of the line extending along the torsion axes of the driven frame torsion beams opposite from the driving force generation means.

3. The angular rate sensor according to claim 1, further comprising monitor means for monitoring displacement amplitude of a rotational oscillation of the driven frame.

4. The angular rate sensor according to claim 2, further comprising monitor means for monitoring displacement amplitude of a rotational oscillation of the driven frame.

5. The angular rate sensor according to claim 1, wherein
   a mass center of the inertial mass is positioned on the line extending along the torsion axes of the driven frame torsion beams, and positioned opposite one of the first and second surfaces of the driven frame; and
   torsion axes of the inertial mass torsion beams are perpendicular to the torsion axes of the driven frame torsion beams.

6. The angular rate sensor according to claim 2, wherein
   a mass center of the inertial mass is positioned on the line extending along the torsion axes of the driven frame torsion beams, and positioned opposite one of the first and second surfaces of the driven frame; and
   torsion axes of the inertial mass torsion beams are perpendicular to the torsion axes of the driven frame torsion beams.

7. The angular rate sensor according to claim 1, wherein
   a mass center of the inertial mass is shifted from the line extending along the torsion axes of the driven frame torsion beams, and positioned opposite one of the first and second surfaces of the driven frame; and
   torsion axes of the inertial mass torsion beams are perpendicular to the torsion axes of the driven frame torsion beams.

8. The angular rate sensor according to claim 2, wherein
a mass center of the inertial mass is shifted from the line extending along the torsion axes of the driven frame torsion beams, and positioned opposite one of the first and second surfaces of the driven frame; and torsion axes of the inertial mass torsion beams are perpendicular to the torsion axes of the driven frame torsion beams.

9. The angular rate sensor according to claim 1, wherein
a mass center of the inertial mass is shifted from the line extending along the torsion axes of the driven frame torsion beams, and positioned opposite one of the first and second surfaces of the driven frame; and torsion axes of the inertial mass torsion beams are parallel to the torsion axes of the driven frame torsion beams.

10. The angular rate sensor according to claim 2, wherein
a mass center of the inertial mass is shifted from the line extending along the torsion axes of the driven frame torsion beams, and positioned opposite one of the first and second surfaces of the driven frame; and torsion axes of the inertial mass torsion beams are parallel to the torsion axes of the driven frame torsion beams.

11. The angular rate sensor angular rate sensor according to claim 1, wherein the inertial mass and the inertial mass torsion beams include at least two of:
  a first inertial mass having a mass center positioned on the line extending along the torsion axes of the driven frame torsion beams, and positioned opposite one of the first and second surfaces of the driven frame, and first inertial mass torsion beams connecting the first inertial mass to the driven frame, torsion axes of the first inertial mass torsion beams being perpendicular to the torsion axes of the driven frame torsion beams;
  a second inertial mass having a mass center shifted from the line extending along the torsion axes of the driven frame torsion beams, and positioned opposite one of the first and second bottom surfaces of the driven frame, and second inertial mass torsion beams connecting the second inertial mass to the driven frame, torsion axes of the second inertial mass torsion beams being perpendicular to the torsion axes of the driven frame torsion beams; and
  a third inertial mass having a mass center shifted from the line extending along the torsion axes of the driven frame torsion beams, and positioned opposite one of the first and second surfaces of the driven frame, and third inertial mass torsion beams connecting the third inertial mass to the driven frame, torsion axes of the third inertial mass torsion beams being parallel to the torsion axes of the driven frame torsion beams; and the angular rate sensor comprises at least two rotational angular rate detection parts of:
  a first rotational angular rate detection part including the first inertial mass and the first inertial mass torsion beams;
  a second rotational angular rate detection part including the second inertial mass and the second inertial mass torsion beams; and
  a third rotational angular rate detection part including the third inertial mass and the third inertial mass torsion beams.

12. The angular rate sensor angular rate sensor according to claim 2, wherein the inertial mass and the inertial mass torsion beams include at least two of:
  a first inertial mass having a mass center positioned on the line extending along the torsion axes of the driven frame torsion beams, and positioned opposite one of the first and second surfaces of the driven frame, and first inertial mass torsion beams connecting the first inertial mass to the driven frame, torsion axes of the first inertial mass torsion beams being perpendicular to the torsion axes of the driven frame torsion beams;
  a second inertial mass having a mass center shifted from the line extending along the torsion axes of the driven frame torsion beams, and positioned opposite one of the first and second surfaces of the driven frame, and second inertial mass torsion beams connecting the second inertial mass to the driven frame, torsion axes of the second inertial mass torsion beams being perpendicular to the torsion axes of the driven frame torsion beams; and
  a third inertial mass having a mass center shifted from the line extending along the torsion axes of the driven frame torsion beams, and positioned opposite one of the first and second surfaces of the driven frame, and third inertial mass torsion beams connecting the third inertial mass to the driven frame, torsion axes of the third inertial mass torsion beams being parallel to the torsion axes of the driven frame torsion beams; and the angular rate sensor comprises at least two rotational angular rate detection parts of:
  a first rotational angular rate detection part including the first inertial mass and the first inertial mass torsion beams;
  a second rotational angular rate detection part including the second inertial mass and the second inertial mass torsion beams; and
  a third rotational angular rate detection part including the third inertial mass and the third inertial mass torsion beams.

13. The angular rate sensor according to claim 1, wherein the inertial mass includes first and second inertial masses having mass centers symmetrically placed about the line extending along the torsion axes of the driven frame torsion beams, and positioned opposite one of the first and second surfaces of the driven frame; and the inertial mass torsion beams include first inertial mass torsion beams connecting the first inertial mass to the driven frame and second inertial mass torsion beams connecting the second inertial mass to the driven frame, torsion axes of the first and second inertial mass torsion beams being parallel to each other.

14. The angular rate sensor according to claim 2, wherein the inertial mass includes first and second inertial masses having mass centers symmetrically placed about the line extending along the torsion axes of the driven frame torsion beams, and positioned opposite one of the first and second surfaces of the driven frame; and the inertial mass torsion beams include first inertial mass torsion beams connecting the first inertial mass to the driven frame and second inertial mass torsion beams connecting the second inertial mass to the driven frame, torsion axes of the first and second inertial mass torsion beams being parallel to each other.

15. The angular rate sensor according to claim 1, wherein
the drive frame includes a first drive frame surrounding a first half circumference of the driven frame with reference to the line extending along the torsion axes of the driven frame torsion beams, and a second drive frame surrounding a second half circumference of the driven frame.

16. The angular rate sensor according to claim 2, wherein the drive frame includes a first drive frame surrounding a first half circumference of the driven frame with reference to line extending along the torsion axes of the driven frame torsion beams and a second drive frame surrounding a second half circumference of the driven frame.

17. The angular rate sensor according to claim 1, wherein the driving force generation means comprises a piezoelectric element on the drive frame, an electrode located opposite the drive frame, or a piezoresistor in the drive frame.

18. The angular rate sensor according to claim 1, wherein the detection means comprises piezoresistors in the inertial mass torsion beams or an electrode located opposite the driven frame.

19. The angular rate sensor according to claim 3, wherein the monitor means comprises a piezoelectric element on the drive frame, an electrode located opposite the drive frames, or piezoresistors in the driven frame torsion beams.

* * * * *